July 25, 1967  R. A. LEWIS  3,332,583
APPARATUS FOR DISPENSING CONFECTIONERY MATERIALS
Filed March 29, 1966  4 Sheets-Sheet 1
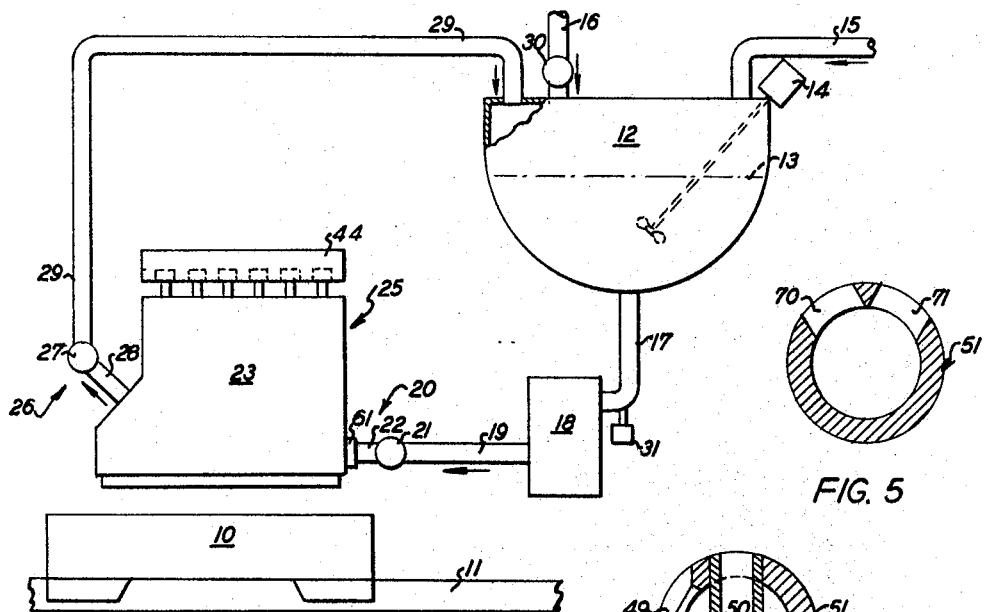
FIG. 1
FIG. 5
FIG. 6
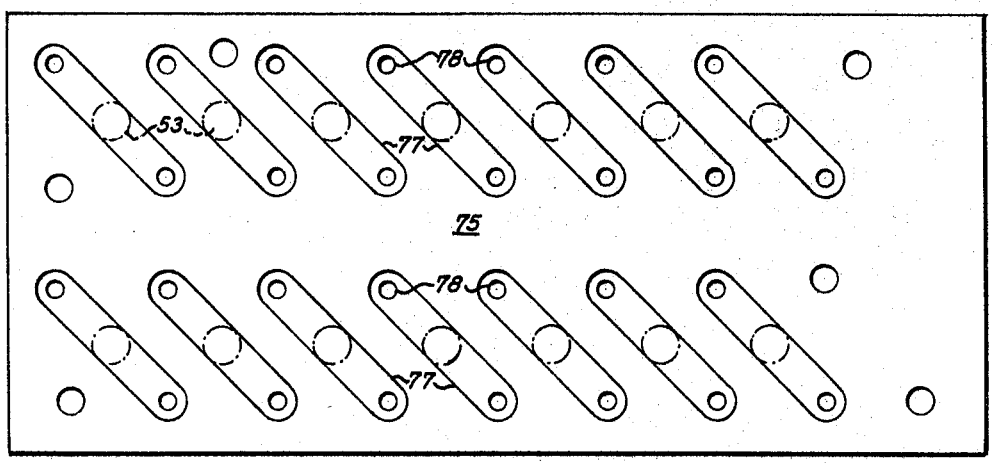
FIG. 7
INVENTOR.
ROBERT A. LEWIS
BY
John J. Hart
ATTORNEY July 25, 1967 R. A. LEWIS 3,332,583
APPARATUS FOR DISPENSING CONFECTIONERY MATERIALS
Filed March 29, 1966 4 Sheets-Sheet 2

INVENTOR
ROBERT A. LEWIS
BY
John J. Hart
ATTORNEY

July 25, 1967   R. A. LEWIS   3,332,583
APPARATUS FOR DISPENSING CONFECTIONERY MATERIALS
Filed March 29, 1966   4 Sheets-Sheet 3

INVENTOR.
ROBERT A. LEWIS
BY
John J. Hart
ATTORNEY

INVENTOR
ROBERT A. LEWIS

_United States Patent Office_

3,332,583
Patented July 25, 1967

3,332,583
APPARATUS FOR DISPENSING CONFECTIONERY MATERIALS
Robert A. Lewis, Matawan, N.J., assignor to Henry Heide, Incorporated, New Brunswick, N.J., a corporation of New York
Filed Mar. 29, 1966, Ser. No. 538,325
10 Claims. (Cl. 222—255)

This invention relates to product material depositing apparatus, and more particularly to apparatus which is especially adapted for the dispensing of confectionery materials such as candy and pastry, though it is within the contemplation of this invention that such apparatus be employed for the dispensing of any other liquid or semi-liquid material.

Apparatus of the indicated type are employed for example in the dispensing of candy material from a reservoir or hopper into molds which are often formed in starch contained in trays that are moved into registered position beneath the pump of such apparatus. The art is well aware that the pumps which are presently employed in such apparatus for such purpose have certain disadvantages which render their use not wholly satisfactory. Thus, many of these prior pumps are so constructed that the candy material handled thereby is exposed to the atmosphere to such an extent that the heat losses from the candy material are considerable and there arises sanitation problems of substantial seriousness. Further, the operation of these prior pumps requires that the candy material contain sufficient moisture to render it of such low viscosity that it is readily flowable. This not only restricts the types of materials such pumps are able to handle, but also necessitates that many of the processes practiced in making the candy include relatively lengthy drying steps. This condition aggravates another disadvantage of those known types of pumps which are provided with a cut-off bar, in that when such prior pumps have been used to some extent for multi-color work, the differently colored candy materials run together at the sections of the pump by way of the top surface of such cut-off bar. Also most prior pumps of this type are of a construction that they are difficult to clean and require that they be substantially disassembled in order to accomplish this operation with any satisfactoriness.

It is the primary purpose of this invention to provide a pump construction which will not be subject to the aforesaid disadvantages.

Specifically, one of the objects of the invention is to provide an improved pump construction which enables the product material to be handled under pressure in a closed system, thereby enabling the handling of materials of a wide range of viscosities and under the most sanitary conditions, and enabling the employment of the product material itself as the heating medium for the pump construction, with the result that the employment of additional heating apparatus for this purpose, as in the prior constructions, is no longer necessary.

Another object of the invention is to provide an improved pump construction which will reliably and precisely dispense charges of the candy material and when employed in multi-color work will do so without danger of the colors mixing.

A further object of the invention is to provide an improved pump construction which is relatively simple to clean and can be so treated without being disassembled in a relatively short period.

A still further object of the invention is to provide an improved pump construction which is much more economical to build than prior pumps of its type and which is extremely durable and simple in its construction.

Other objects of the invention, as well as the advantages and features of novelty thereof will become apparent from the following description when read in connection with the accompanying drawings, which illustrate by way of example, the adaptation of the invention to the manufacture of candy. In the drawings:

FIG. 1 is a schematic view showing a closed system for depositing candy material in starch molds provided on trays;

FIG. 5 is a vertical sectional view of the valve member in a pump unit and is taken along the line 5—5 of FIG. 3;

FIG. 6 is another vertical sectional view of the valve member taken along the line 6—6 of FIG. 3; and FIG. 7 is a top plan view of a base orifice plate for a pair of adjacent pump units.

Figure 2:
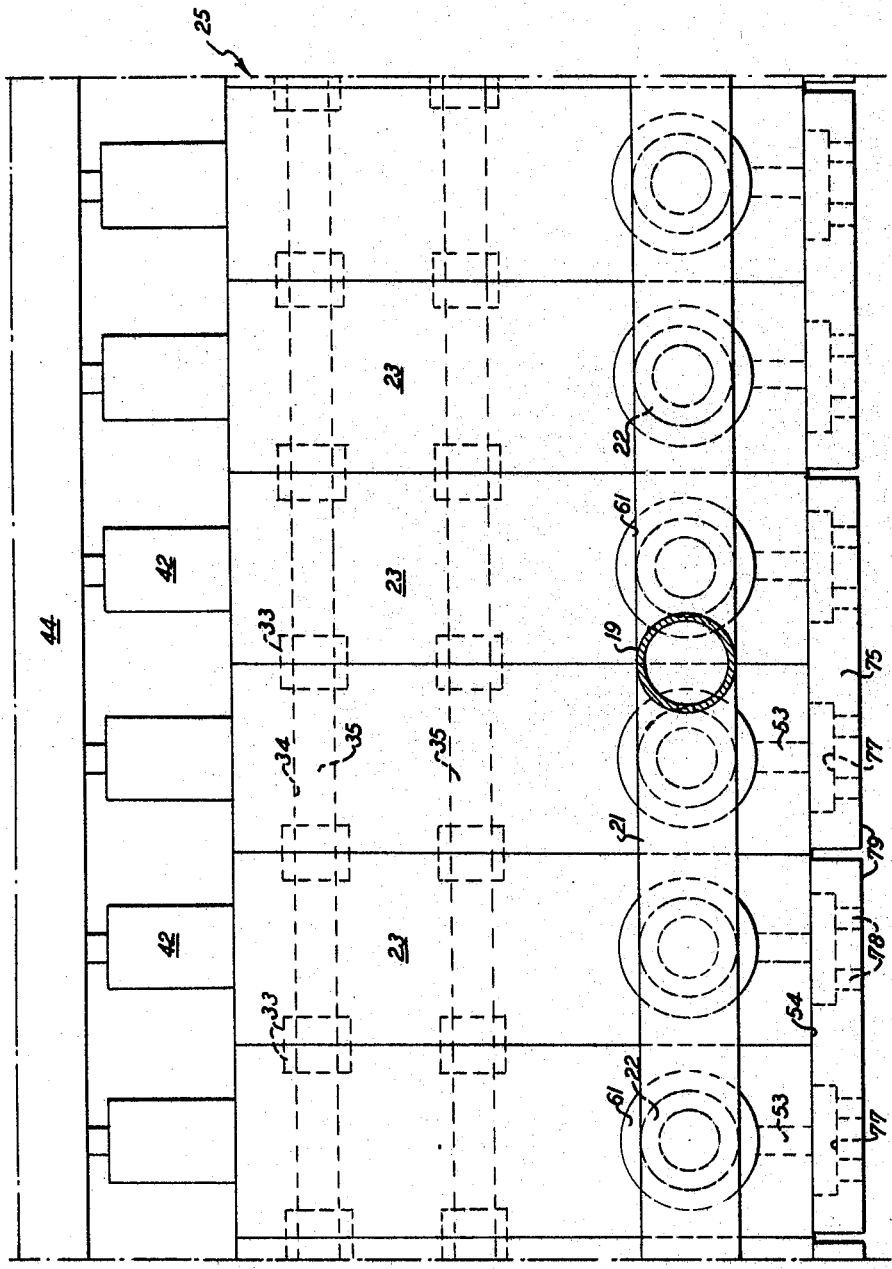
FIG. 2 is a partial side elevational vew of the pump construction, the view being taken from the right hand side of such construction shown in FIG. 1.

Referring more particularly to FIG. 1 of the drawings which illustrates a closed system to be employed for depositing candy material into starch molds formed in trays 10 which are being carried by suitable conveyor mechanism, indicated generally by the numeral 11, to different stations in the candy machine at which occur the required steps in the overall process of making the candy. The closed system shown is located at one of such stations and comprises a closed batch holding kettle 12 containing the product material 13 which is to be dispensed to the trays 10 and which is constantly agitated by a mixer 14 of known construction. The kettle 12 is a closed vessel that is heated in any suitable manner known to the art to maintain the product material at a proper temperature. The product material is fed into the kettle 12 through a conduit 15 which is connected to a suitable source of supply thereof such as a product cooker. Color and flavor are added to the cooked product material contained in the kettle 12 and properly mixed with the latter by the mixer 14. The complete product material is discharged at the bottom of the kettle into a suitable discharge conduit 17 that delivers the material to a pump 18 of known construction. The pump 18 delivers the product material at a pressure of from 3 to 50 pounds per square inch, depending on the type of material and viscosities being employed, into a pipe 19 which conducts the material under pressure to a distributing closed header generally designated 20. The header 20 may be composed of a closed transverse conduit 21 having connected thereto a plurality of pipes 22, each of which delivers the product material under the required pressure, to one of the pump units 23 which form the composite pump construction generally designated 25. It will be understood that a tray 10 containing the mold forms is provided with a substantial number of rows of mold cavities extending in the direction of the feed of such tray and that each pump unit 23 will have a row of feed cylinders equal in number to the number of mold cavities in each row thereof. The composite pump 25 is constructed to provide one row of feed cylinders for each pair of adjacent rows of mold cavities in a tray 10 so that the composite pump is composed of a plurality of units 23 equal in number to one half the number of rows of mold cavities in the tray. The excess product material not deposited into the mold cavities in the trays flows without interruption through each pump unit 23 and is discharged therefrom into a collecting header generally designated 26 and like the header 20 may be composed of a transverse conduit 27 connected by a plurality of pipes 28 to the pump units 23. The product material discharged into the header 26 by the pump units 23 is consolidated into a single stream by such header and delivered to a return pipe 29 which conducts the discharged product material back to the batch holding kettle 12.

It will be understood from the aforesaid description of the closed system embodying this invention, that the use of the usual open product hopper is dispensed with and that the product material is handled under conditions which assure a minimum of exposure to pollution from the atmosphere. Furthermore, as there is a constant circulation of the product material within such closed system, the material is maintained constantly at a substantially uniform temperature throughout such system. This circulation can be maintained uninterruptedly without operating the composite pump construction 25 thereby eliminating the necessity for the usual washouts which must be performed with the pump construction of the prior art during lunch periods, or breakdowns occurring in the overall machine at places other than the circulatory system for the product material. As will hereinafter become more clear this closed pressure system also enables the pump units to be rapidly cleaned and washed without removal of such units.

Figure 3:
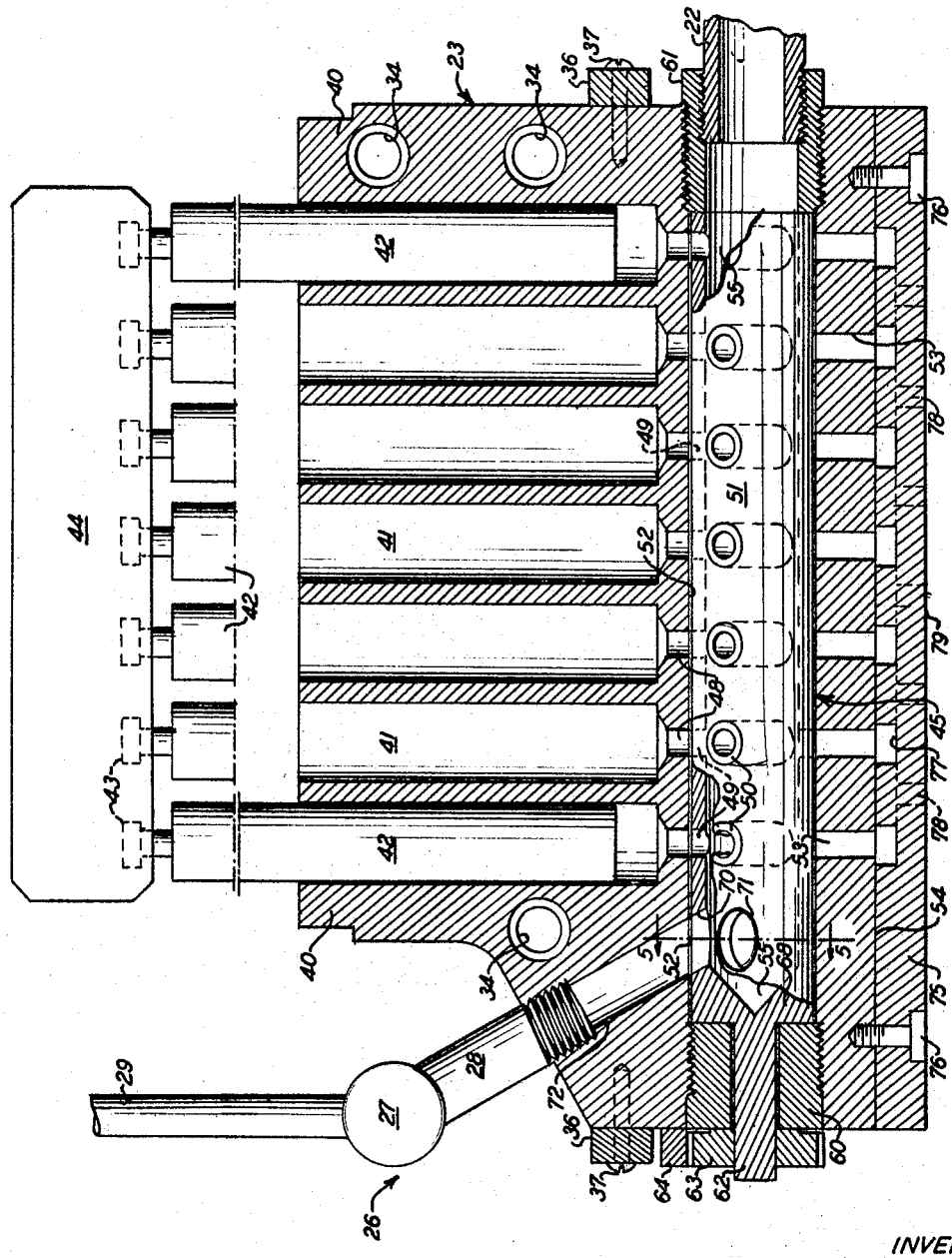
FIG. 3 is a vertical sectional view of one of the units of the pump construction.

Considering now in greater detail the composite pump construction 25, it will be noted from FIGS. 2 and 3 of the drawings that the pump units 23 are provided with aligned transverse openings 34 through which tie bolts 35 extend. Preferably the ends of the openings 34 in each pump unit are enlarged to receive bushings 33 which are seated in the adjoining enlarged ends of adjacent openings and span the joints between adjacent units. The tie bolts are threaded at their ends and nuts are screwed thereon to secure the units 23 together. The tie bolts 35, together with the base 75 on which the pump units 23 are mounted, assure that such pump units 23 will be securely fixed together into one integrated whole pump construction 25.

As will appear more clearly in FIG. 3 of the drawings, each of the pump units 23 is composed of a housing 40 which is bored to provide a row of aligned cylinders 41 in each of which is mounted a reciprocating piston 42 of a suitable construction known to the art. As is usual with such pistons, they are provided at their upper ends with a head 43 to which is connected an operating member or crosshead 44 that is raised and lowered by suitable mechanism to raise and lower the entire row of pistons in properly timed relation to the movements of a valve member 45 located within the pump unit 23. The lower end of each of the cylinders 41 terminates in a reduced outlet opening 48 which in the reciprocating rotative movements of the valve member 45, registers alternately in timed relation with an opening 49 and the upper end of a tube 50 in the valve member 45 (compare FIGS. 3 and 6). As is shown in these figures, the valve member 45 has a tubularly-shaped body portion 51 which snugly fits in a cylindrically-shaped bore 52 extending lengthwise of the pump unit 23 and formed in the housing 40 thereof below the aligned cylinders 41 which are in communication with such bore through the reduced outlet openings 48 thereof. Diametrically opposite the cylinder outlet openings 48 are provided in the bottom wall portion of the housing 40 a series of discharge passages 53 which are aligned with the outlet openings 48 and extend from the bore 52 to the bottom wall 54 of the housing 40. The series of openings 49 in the body portion 51 come into registration only with the outlet openings 48 for the purpose of bringing the cylinders 41 into communication with the hollow interior 55 of such body portion. The tubes 50 which extend through the interior 55 of the body portion 51 and completely through such body portion are paired with the openings 49 so that the axial center lines of each associated opening 49 and tube 50 are contained within the same vertical plane, but are disposed at an angle of approximately 60° to each other. Thus, by reciprocatingly rotating the valve member 45 about its longitudinal axis through a 60° range, first the openings 49 are brought into registry with the cylinder outlet openings 48 and then the tubes 50 are brought into registry with such outlet openings. When the tubes 50 are in registry with the outlet openings 48 they will also be in registry with the discharge openings 53 in the bottom wall portion of the housing 40.

Figure 4:
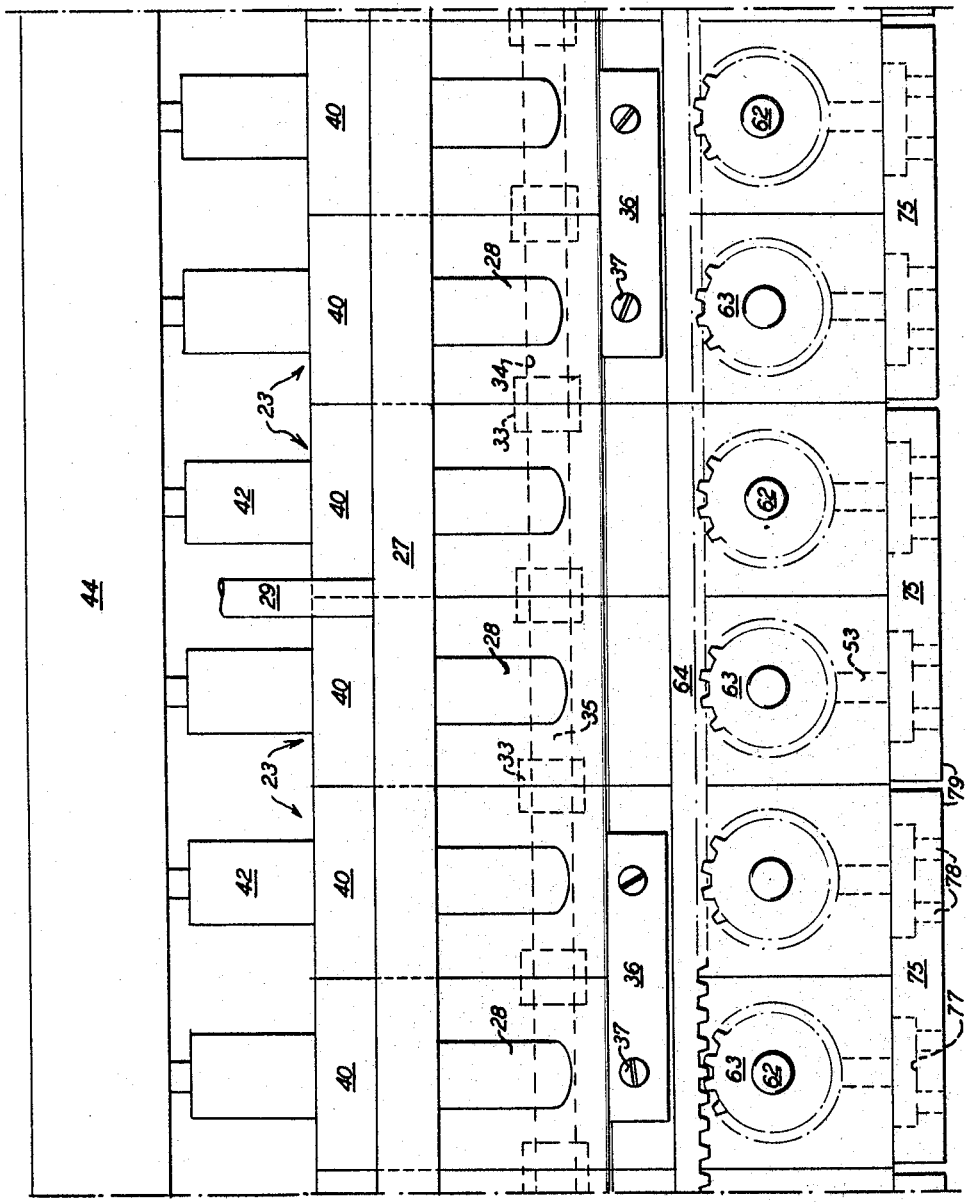
FIG. 4 is a partial side elevational view of the pump construction looking toward the left hand side of the same as viewed in FIG. 1.

The body portion 51 is located in the bore 52 between two end coupling members 60 and 61 which fix the longitudinal position of such body portion in the bore so that the openings 49 and tubes 50 thereof properly register with the outlet openings 48 and the discharge openings 53 in the rotative movements of the valve member. The end coupling members 60 and 61 are in threaded engagement with screw threads provided in the end portions of the wall of bore 52 and are adjustably secured therein so that the inner ends thereof engage the ends of the body portion 51 to function as stops for such body portion without preventing rotative movement thereof. The coupling member 60 is provided with a reduced central passage through which extends a shaft member 62 integrally formed with the adjacent end of the body portion 51 which is closed. Mounted on the end portion of the shaft member 52 projecting beyond the coupling member 60 is a gear 63 that meshes with a rack 64 extending transversely of the units 23. As is indicated in FIG. 4 of the drawings, the rack 64 extends the combined width of the units 23 in the composite pump construction 25 and engages with each of the gears 63 of such units to simultaneously reciprocate the valve members 45 of all of such units. The rack 64 is guided in its sliding movements by a plurality of aligned guide members 36 connected to the pump units 23 by screws 37 and is suitably connected at one end to a reciprocating operating member (not shown) of any suitable construction, such as a cam or link. The coupling member 61 which forms a stop for the open end of the body portion 51, has an interior diameter substantially the same as the interior diameter of the valve member 45 and is provided at its outer end with an internal thread by which the associated header branch pipe 22 is connected thereto.

The valve body portion 51 is further provided at its closed end adjacent to the end wall 68 thereof with a pair of openings 70, 71 (compare FIGS. 3 and 5 of the drawings). The openings 70 and 71 have center lines which radiate outwardly in the same plane from the longitudinal axis of the body portion 51 and which are disposed at an angle of 60° to each other. The openings 70, 71 are located so that the opening 70 is in alignment with the row of openings 49 in the valve member and the opening 71 is in alignment with the row of tubes 50 extending through such member. In the reciprocating rotative movements of the valve members, the openings 70 and 71 alternately register with the lower end of an upwardly inclined passage 72 formed in the housing 40 and connected at its upper end with the associated header branch pipe 28.

It will be understood from the aforesaid description of the valve mechanism in each pump unit 23, that the product material fed into such unit under pressure through the header branch pipe 22 flows through the coupling 61 and into the open end of the hollow interior or chamber 55 in the valve body portion 51; thence through such chamber and through either of the openings 70, 71 into the passage 72 which conducts the fluid into the associated header branch pipe 28 for return to the kettle 12. This flow will not be interrupted during the intervals it takes the valve member 45 to move through its 60° range of rotational movement in the operations thereof because of the closeness of the two holes 70 and 71 and the rapidity of the rotational movement of the valve member 45. Due to the closeness of tolerance in the exterior dimensions of the valve member 45 and the interior dimensions of the bore 52 in which such valve member is located, the apparatus is product-tight, as distinguished from water-tight, and consequently the holes 70 and 71 can be made as one opening or slot with equally satisfactory results. In one of the positions of the valve member 45, the opening 70 thereof will be full registry with the passage 72 and the openings 49 thereof will be in full registry with the outlet openings 48 of the cylinders 41. After the valve member has moved to such position, the pistons 42 are caused to move upwardly and under the combined suction action of such pistons and the pressure exerted on the product material, the latter will flow upwardly into the cylinders 41 so as to insure a fast, accurate loading of such cylinders. As the volume of the flow of such material through the valve member is greatly in excess of the volume needed to charge the cylinders, the flow thereof continues uninterruptedly, though at diminished volume, into the passage 72 during the charging of the cylinders 41. When the pistons 42 reach their highest position, the rack bar 64 is actuated to rotate the valve member 60° to bring the tubes 50 of the valve member 45 into registry with the cylinder outlet openings 48 and the discharge passages 53, and to bring the flow opening 71 into full registry with the passage 72. The pistons 42 are then actuated to force the product material out of the cylinders 41 and through the cylinder opening 48, the tubes 50 and the discharge passages 53. During this operation, the flow of the product material through the valve member continues through the opening 71 and into the passage 72. As shown in FIG. 3 the interior surface of the end wall 68 is preferably configured to facilitate the discharge of the product material from the chamber 55 through the openings 70 and 71 into the passage 72.

A base orifice plate 75 is secured against the bottom walls 54 of each pair of adjacent housings 40 in any suitable fashion as by means of screws 76. As will be noted from a comparison of FIGS. 2–4 and 7 of the drawings, the upper portion of the orifice plate 75 is provided with two rows of recesses 77, each of such rows being associated with the valve member 45 and the housing discharge passages 48 of one of the connected housings. It will also be noted that the recesses 77 in each row thereof are disposed at an angle of 45° to the longitudinal center line of the valve member 45 and that the central portion of each of such recesses is aligned with a discharge passage 53. Communicating with the outer ends of each recess 77 are discharge orifices 78 which extend from the bottom walls of such recess to the bottom wall 79 of the plate 75.

It will be understood from the foregoing that the product material forced down through the discharge passages 53 by the descending pistons 42, will be deposited in the central portions of the recesses 77 and forced out to the two ends of such recesses and into the discharge orifices 78 communicating with such outer recess ends, to be deposited into the molds positioned below such discharge orifices 78. Thus, each pump unit 23 is enabled to take care of two rows of molds arranged in staggered relation in the tray 10. By utilizing one orifice plate 75 for two pump units, the construction of the pump may be simplified and the units united more securely together. It will be understood also that by a selective choice of the orifice plates 75 and a suitable modification of the product supply and discharge elements associated with the pump units 23, the latter can be utilized to pump product materials of different colors and flavors at the same time, without danger of color leakage between the pump units.

The foregoing description is believed to provide an adequate explanation of the operation of the pumping system embodying the invention. As previously indicated, the product material circulatory system may be maintained in operation even though the pump is not operating to deposit such material in the molds of the trays 10. When it is felt necessary to clean the valve members 45, all that is necessary to do is to open the drain valve 31 to discharge any product material remaining in the batch holding kettle and after that has been done, to close drain valve 31 and open valve 30 on a pipe 16 connected to a suitable source of hot water or steam. The hot water may be fed into the kettle 12 until it fills the latter to about the extent normally used by the product material and retained in there until it is heated to the temperature desired. Then the heated water is pumped through the system in the same manner that the product material is in the use of the machine. During the pumping of the hot cleaning water the valve members 45 will be cleaned by the flow-through action of the product pump, while the cylinders and discharge tubes and passages are cleaned by piston action. After the system has been thoroughly washed, the drain valve 31 is again opened to discharge the cleaning water from the system.

While I have hereinabove described by way of example a preferred embodiment and usage of my invention, it will be apparent to those skilled in the art that it may be advantageously employed for other uses and that changes and modifications may be made therein without departing from the spirit of the invention or the scope of the appended claims.

I claim:
1. In product material depositing apparatus, the combination of a housing provided with a row of cylinders, each cylinder having a bottom opening and a piston mounted for reciprocating movement therein, said housing having a circular chamber arranged below said cylinders and having its longitudinal axis extending in parallelism with a horizontal line passing through the center lines of said row of cylinders, the bottom openings of said cylinders being in communication with said chamber and a row of discharge openings equal in number to said bottom openings formed in said housing along the length of and communicating with the circular chamber, a tubular valve member located in said chamber and having a row of openings in the cylindrical wall thereof for bringing the interior of said valve member into communication with said cylinder bottom openings and said cylinders, and having a row of tubes extending transversely therethrough for bringing said cylinder bottom openings and said cylinders into communication with said discharge openings, means for supplying product material to the interior of said valve member, means for rotating said valve member to alternately bring the wall openings thereof into registry with said cylinder bottom openings, and the tubes thereof into registry with said cylinder bottom openings and said discharge openings, and means for reciprocating said pistons in said cylinders.

2. Apparatus as defined in claim 1, including means for feeding the product material into one end of said valve member, and means for discharging the excess product material from the other end of said valve member.

3. Apparatus as defined in claim 2, in which said valve member, said feeding means and said discharging means form part of a closed circuit for the flow of said product material, said feeding means including pump means for feeding the product material under pressure through said valve member and said discharging means.

4. Apparatus as defined in claim 2, in which said valve member is closed at its other end and is provided in the cylindrical wall thereof adjacent to said closed end with a pair of openings forming part of said discharging means, one of said pair of openings being aligned with said wall openings of said valve member, and the other of said pair of openings being aligned with the inlet ends of said valve member tubes, said discharging means further including a discharge passageway formed in said housing so that said pair of openings can alternately register with the entry end thereof, and means for conducting away the product material discharged through such passageway.

5. Apparatus as defined in claim 4, in which said closed end of said valve member is provided with a shaft member, said valve member rotating means comprising an actuatable member connected to said shaft, and means for operating said actuatable member to impart a reciprocating rotational movement to said valve member.

6. Apparatus as defined in claim 1, including an orifice plate connected to the bottom of said housing, said orifice plate having a row of elongated recesses provided in the upper surface thereof and equal in number to said discharge openings, the central portions of said recesses being in registry and in communication with said discharge openings, and said plate being provided with discharge orifices communicating with the ends of said recesses.

7. Apparatus as defined in claim 2, including a plurality of pump units arranged in side-by-side relation and each constituted of a housing and valve member as defined, and means for uniting said pump units in side-by-side relation, said rotating means being connected to the valve members of all of said pump units for rotating the same simultaneously in synchronism.

8. Apparatus as defined in claim 7, in which said feeding means comprises means for feeding the product material simultaneously into said one end of all of said valve members, and in which said discharging means removes the excess product material from the other ends of all of said valve members simultaneously.

9. Apparatus as defined in claim 8, in which said feeding means comprises a plurality of first conduits connected to said one end of said valve members, a pump connected at one side to the entry ends of said first conduits and feeding the product material under pressure into all of said first conduits simultaneously, and in which said discharging means comprises a plurality of second conduits connected to said other end of said valve members, and a single return conduit connected to the discharge ends of all of said second conduits and connected to the other side of said pump.

10. Apparatus as defined in claim 9, including a closed supply container for the product material connected to said single return conduit and located between the latter and said pump, and a conduit connecting said supply container to said other side of the pump.

References Cited
UNITED STATES PATENTS

| | | | |
|---|---|---|---|
| 711,144 | 10/1902 | Wright | 222—255 |
| 1,569,300 | 1/1926 | Purvis | 222—255 |
| 2,771,225 | 11/1956 | Perkins | 222—276 X |
| 3,193,156 | 7/1965 | Egee et al. | 222—276 X |

ROBERT B. REEVES, *Primary Examiner.*

F. R. HANDREN, *Assistant Examiner.*